(12) United States Patent
Zheng et al.

(10) Patent No.: US 9,643,479 B1
(45) Date of Patent: May 9, 2017

(54) BOX COVER OF PICKUP TRUCK

(71) Applicant: Hang Zhou Golden Sun Auto Parts Co., Ltd., Hangzhou (CN)

(72) Inventors: Shaoyong Zheng, Hangzhou (CN); Xiaohong Tang, Hangzhou (CN)

(73) Assignee: HANG ZHOU GOLDEN SUN AUTO PARTS CO., LTD., Hangzhou (CN)

( * ) Notice: Subject to any disclaimer, the term of this patent is extended or adjusted under 35 U.S.C. 154(b) by 0 days.

(21) Appl. No.: 15/138,231

(22) Filed: Apr. 26, 2016

(51) Int. Cl.
  *B60J 10/00* (2016.01)
  *B60J 10/90* (2016.01)
  *B60J 7/16* (2006.01)

(52) U.S. Cl.
  CPC ............ *B60J 10/90* (2016.02); *B60J 7/1607* (2013.01)

(58) Field of Classification Search
  CPC ........... B60J 7/141; B60J 10/90; B60J 7/1607
  USPC ............. 296/100.03, 100.04, 100.09, 100.17
  See application file for complete search history.

(56) References Cited

U.S. PATENT DOCUMENTS 7,484,788 B2    2/2009  Calder et al.
9,004,571 B1 *  4/2015  Bernardo ................. B60J 7/141
                                                   296/100.03

* cited by examiner

*Primary Examiner* — Joseph D Pape
(74) *Attorney, Agent, or Firm* — Perkins Coie LLP

(57) ABSTRACT

A box cover of a pickup truck, includes at least two panels and at least one rotating shaft mechanism. The rotating shaft mechanism is connected with two adjacent panels, and the rotating shaft mechanism includes a base and two connecting units. The base includes a base portion having a hollow structure inside and two rotating shaft portions respectively disposed on two sides of the base portion. The base portion and one of the rotating shaft portion form a rotating space. The rotating space is isolated from the interior of the base portion. The connecting unit includes a fixing portion fixedly connecting with the panels and a rotary portion rotatably inserted into the rotating space. It is capable of avoiding water falling into the rotating space of the rotating shaft mechanism from seeping into the interior of the base portion of the rotating shaft mechanism. The structure is simple and waterproof.

12 Claims, 6 Drawing Sheets

BOX COVER OF PICKUP TRUCK

FIELD OF THE INVENTION

The present invention relates to the technical field of pickup truck accessories, and, more particularly, relates to a box cover of a pickup truck.

DESCRIPTION OF THE RELATED ART

A pickup truck is a kind of vehicles with a sedan car head and an open type cargo box. Pickup trucks are very popular among customers because of their good-looking appearance, sedan car like comfort, strong power, low price, and multi-use for carrying people and cargoes.

However, the cargo box of the pickup truck is open, and thus the articles in the cargo box are exposed to the sun and rain, and the pickup truck is poor against theft. Those defects affect the promotion and use of the pickup trucks. The U.S. Pat. No. 7,484,788B2 discloses a box cover of a pickup truck which is disadvantageous in that the water can seep into the pivot members 152, and thus it is needed to add waterproof strips, that is sealing members 182 in the patent. The waterproof strips are complicated in installation and have poor stability. When the water seeps into the pivot members 152, the water cannot completely be drained from holes 372, and the holes damages the good-looking appearance of the cargo box.

BRIEF SUMMARY OF THE INVENTION

One objective of the present invention is to provide a box cover of a pickup truck to solve the above problems, wherein the interior of a base of a rotating shaft mechanism is isolated from rotating space, thus avoiding water from seeping into the base, simplifying the structure and reducing waterproof strips.

To achieve the above objective, the present invention provides a box cover of a pickup truck, including at least two panels and at least one rotating shaft mechanism, connecting with two adjacent panels. The at least one rotating shaft mechanism includes a base and two connecting units. The base includes a base portion and two rotating shaft portions. The base portion has a hollow structure inside. The rotating shaft portions are disposed on two sides of the base portion, respectively. The base portion and one of the rotating shaft portions form a rotating space, and the rotating space is isolated from the interior of the base portion. Each of the connecting units includes a fixing portion and a rotary portion. The fixing portion is fixedly connected with one of the panels, and the rotary portion taking one of the rotating shaft portions as a rotating center is rotatably inserted into the rotating space.

In one embodiment of the present invention, the box cover of the pickup truck may further include a side assembly, and the side assembly may comprise at least two rotating shaft joints, at least two side fences and at least two first angle joints. The side fences may enclose sides of the panels. Each of the first angle joints may be fixedly connected with the fixing portion and one of the side fences, and the rotating shaft joints may be connected with the base portion.

In one embodiment of the present invention, each of the first angle joints may include a convex portion. Each of the rotating shaft joints may include a concave portion, the convex portion may be disposed opposited to one of the concave portions, a groove may be formed between the convex portion and one of the concave portions, and the rotating space may be communicated with the groove.

In one embodiment of the present invention, each of the first angle joints may include a first clamping portion and a second clamping portion, the first clamping portion may be inserted into the fixing portion, and the second clamping portion may be inserted into one of the side fences.

In one embodiment of the present invention, each of the rotating shaft joints may include a third clamping portion, and the third clamping portion may be inserted into the base portion.

In one embodiment of the present invention, the box cover of the pickup truck may further include at least one fixing mechanism. The fixing mechanism may be disposed on at least one of backs of the panels. The at least one fixing mechanism may include a fixing groove, a sliding block, a sliding bar, a buckle and a fastener. The fixing groove may be fixedly disposed in one of the panel, and a notch of the fixing groove may face the backs of the panels. The sliding block may be slidably disposed in the fixing groove. A surface of the sliding bar may be provided with screw threads. One end of the sliding bar may be rotationally clamped in the sliding block. The buckle may be movably sleeved on the sliding bar. The fastener may be movably disposed on one side of the buckle to lock or unlock the buckle.

In one embodiment of the present invention, the fixing groove may include at least two first openings, and the first openings may be disposed on two sides of the fixing groove.

In one embodiment of the present invention, the sliding block may include a clamping groove and a through groove communicating with the clamping groove. The clamping groove may be approximately vertical to the through groove. One end of the sliding bar clamped at the sliding block may be T-shaped, and the T-shaped end of the sliding bar may be rotationally disposed in the clamping groove and the through groove.

In one embodiment of the present invention, the fastener may be a nut, and the nut may be in threaded fit with the sliding bar.

In one embodiment of the present invention, the fastener may be a spanner, and the spanner may be rotationally installed at one end of the sliding bar.

In one embodiment of the present invention, the second fixing mechanism may further include a spanner fixing block. The spanner fixing block may be disposed in the fixing groove. When the spanner is not used, the spanner is fixed in the spanner fixing block, and when the spanner is used, the spanner is pulled out from the spanner fixing block.

In one embodiment of the present invention, the box cover of the pickup truck may further include a waterproof assembly. The waterproof assembly may include a first waterproof strip. The first waterproof strip may be disposed on one side of the panels, and the first waterproof strip may be approximately parallel to the rotating shaft mechanism. The first waterproof strip may include a plurality of sheets, and the height of one of the sheets disposed on the outer side may be greater than the height of one of the sheets disposed on the inner side.

In one embodiment of the present invention, the waterproof assembly may further include a plurality of second waterproof strips, and the second waterproof strips may be disposed on sides of the panels. The second waterproof strips may be approximately vertical to the rotating shaft mechanism, and the second waterproof strips may have double-D-shaped cross sections, respectively.

Compared with the prior art, the present invention has the following beneficial effects:

In the box cover of the pickup truck of the present invention, the rotating space is isolated from the interior of the base portion, thereby avoiding water falling into the rotating space of the rotating shaft mechanism from seeping into the interior of the base portion of the rotating shaft mechanism, and waterproof strips is not needed to be added at the rotating shaft mechanism. The structure is simple and waterproof.

The rotating space is communicated with the groove, and water falling in the rotating space can flow in the groove and flow away from one end of the groove, and thus the drainage is good, avoiding formation of additional water outlet. The water resistance is higher.

DETAILED DESCRIPTION OF THE INVENTION

The present invention is clearly and completely described below with reference to the accompanying drawings through embodiments.

With referring to FIG. 1 to FIG. 6, the present invention provides a box cover of a pickup truck including at least two panels 1 and at least one rotating shaft mechanism 2. The at least one rotating shaft mechanism 2 is connected with two adjacent panels 1. The rotating shaft mechanism 2 includes a base 21 and two connecting units 22. The base 21 includes a base portion 211 and two rotating shaft portions 212. The base portion 211 has a hollow structure inside. The rotating shaft portions 212 are disposed on two sides of the base portion 211, respectively. The base portion 211 and one of the rotating shaft portions 212 form a rotating space 202. The rotating space 202 is isolated from an interior of the base portion 211. Each of the connecting units 22 includes a fixing portion 221 and a rotary portion 222. The fixing portion 221 is fixedly connected with one of the panels 1. The rotary portion 222 taking one of the rotating shaft portions 212 as the rotating center is rotatably inserted into the rotating space 202. When water falls onto the box cover of the pickup truck, the water seeps into the rotating shaft 202 along the interval between the base portion 211 and the rotary portion 222. The rotating space 202 is isolated from the interior of the base portion 211, and thus the water can only stay in the rotating space 202 and cannot seep into the base portion 211. Therefore, waterproof strips are not needed to be added. Compared with the box cover of the pickup truck disclosed in the U.S. Pat. No. 7,484,788 B2, the structure of the box cover of the pickup truck of the present invention is simpler and waterproofness, and the box cover of the pickup truck of the present invention is better.

In this embodiment, the box cover of the pickup truck includes three panels 1. The three panels 1 are connected through two rotating shaft mechanisms 2, respectively. However, it is not limited thereto, and the number of the panels 1 and the rotating shaft mechanisms 2 may be more. All the three panels 1 are glass fiber reinforced plastic honeycomb plates. The dimensions of the two rotating shaft mechanisms 2 are different, and the dimension of the rotating shaft mechanism 2 close to the front of the pickup truck is larger than the dimension of the rotating shaft mechanism 2 close to the rear of the pickup truck, but it is not limited thereto. The rotating shaft portion 212 is a cylinder. The surface of each base portion 211 facing the rotating shaft portions 212 is an arc surface, and the rotary portion 222 is an arc hook, and thus the outer surfaces of the rotary portion 222 and the rotating shaft portion 212 are smooth, and the rotary portion 222 and the rotating shaft portion 212 rotate easily and connect reliably. A distance of two ends of the rotary portion 222 connecting with the rotating shaft portion 212 is less than the diameter of the rotating shaft portion 212, and thus the rotary portion 222 can firmly enclose the rotating shaft portion 212, and the structure is more stable. The connecting units 22 can rotate 0°-95° relative to the base 21, and then the two adjacent panels 1 can rotate 0°-190° relatively. The rotation range is very large, and thus it is very convenient to open the box cover of the pickup truck when using.

The box cover of the pickup truck further includes a side assembly 4. The side assembly 4 comprises two rotating shaft joints 40, at least two side fences 41, at least two first angle joints 42 and at least two second angle joints 43. The side fences 41 enclose sides of the panels 1. Each of the first angle joints 42 is fixedly connected with the fixing portion 221 and one of the side fences 41. The rotating shaft joints 40 are connected with the base portion 211. The second angle joints 43 are disposed at outside corners of the panel 1, and each of the second angle joints 43 is connected with two sides of the panel 1. The side assembly 4 protects the panels 1 and the rotating shaft mechanisms 2, avoiding the sides of the panels 1 or the ends of the rotating shaft mechanisms 2 from damage caused by collision.

Figure 3:
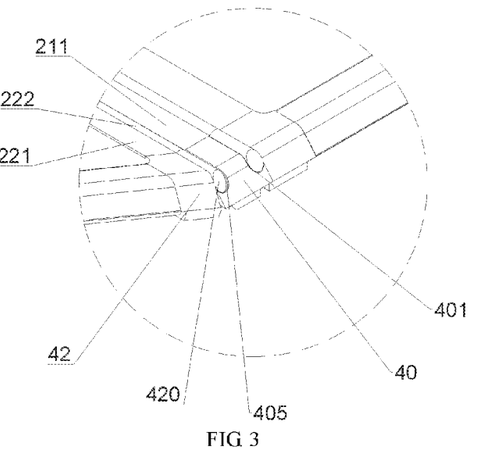
FIG. 3 is a partial enlarged view of portion A in FIG. 2.
Figure 4:
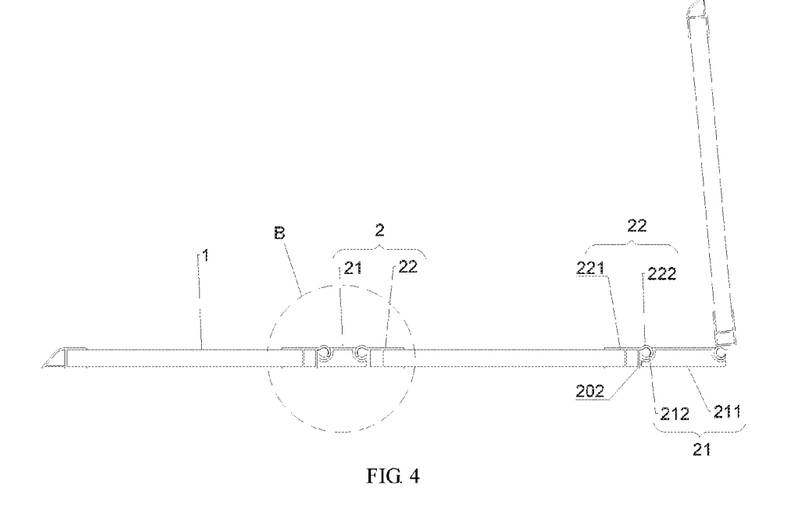
FIG. 4 is a sectional view of the box cover of the pickup truck of the present invention.
Figure 5:
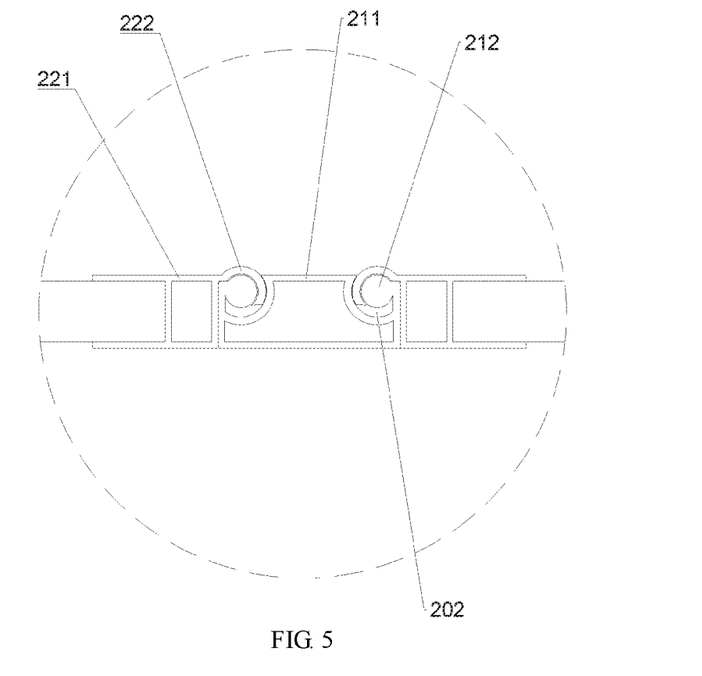
FIG. 5 is a partial enlarged view of portion B in FIG. 4.
Figure 6:
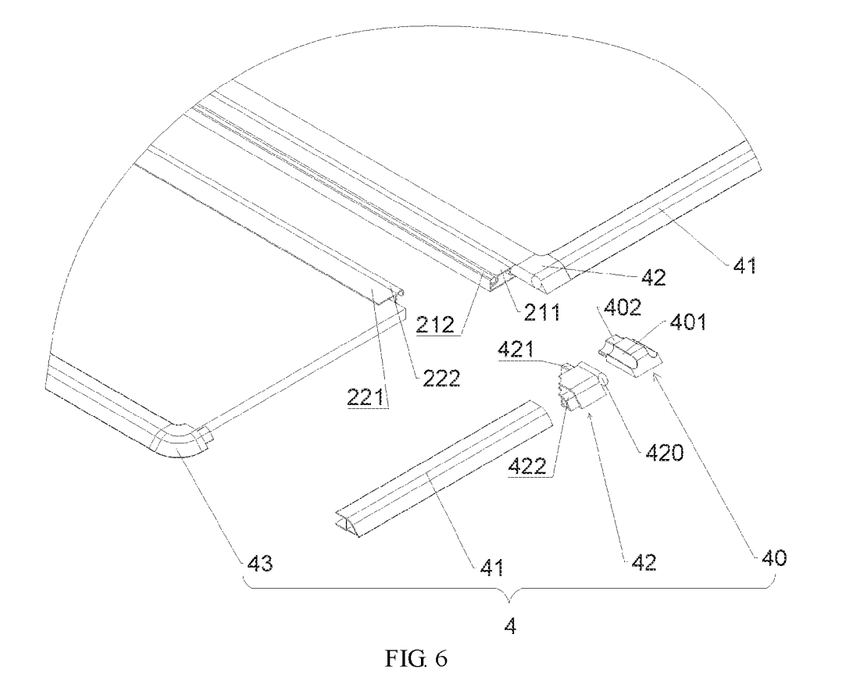
FIG. 6 is a back view of the box cover of the pickup truck of the present invention.

Each of the first angle joints 42 includes a convex portion 420, and each of the rotating shaft joints 40 includes two concave portions 401. The convex portion 420 is disposed opposite to one of the concave portions 401. A groove 405 is formed between the convex portion 420 and one of the concave portions 401. The rotating space 202 is communicated with the groove 405 such that water flows to the groove 405 through the rotating space 202 and flows away from one end of the groove 405, which means the groove 405 is the drainage groove, ensuring that the water seeping into the rotating space 202 is quickly drained, ensuring high water drainage and avoiding formation of additional water outlet. A surface of the convex portion 420 is an arc surface, and correspondingly, a surface of the concave portion 401 is also an arc surface, ensuring quick drainage of water and avoiding ponding in the rotating space 202.

Each of the first angle joints 42 includes a first clamping portion 421 and a second clamping portion 422. The first clamping portion 421 is inserted into the fixing portion 221, and the second clamping portion 422 is inserted into one of the side fences 41, and thus each of the first angle joints 42 is connected with the fixing portion 221 and one of the side fences 41 to reinforce the mounting strength of the side fences 41.

Each of the rotating shaft joints 40 includes a third clamping portion 402. The third clamping portion 402 is inserted into the base portion 211 to seal the end of the base portion 211 and prevent water from flowing into the base portion 211 from the end of the base portion 211.

Figure 7:
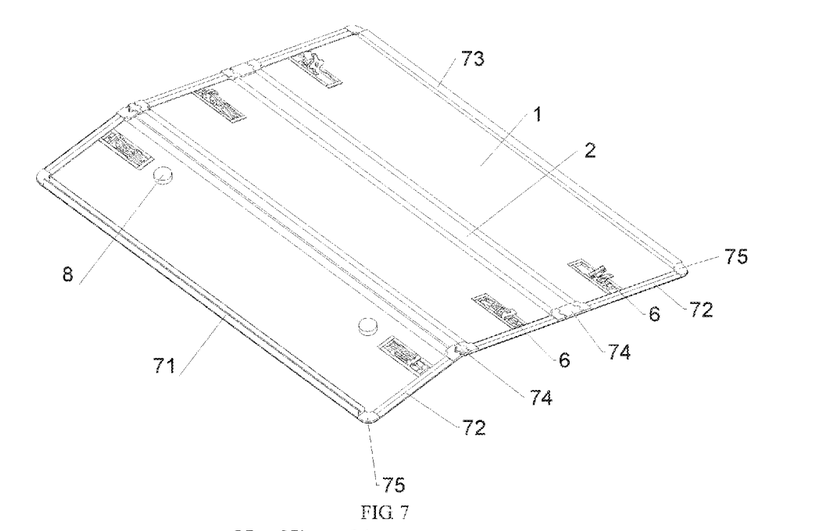
FIG. 7 is a partial exploded view of the box cover of the pickup truck of the present invention.
Figure 8:
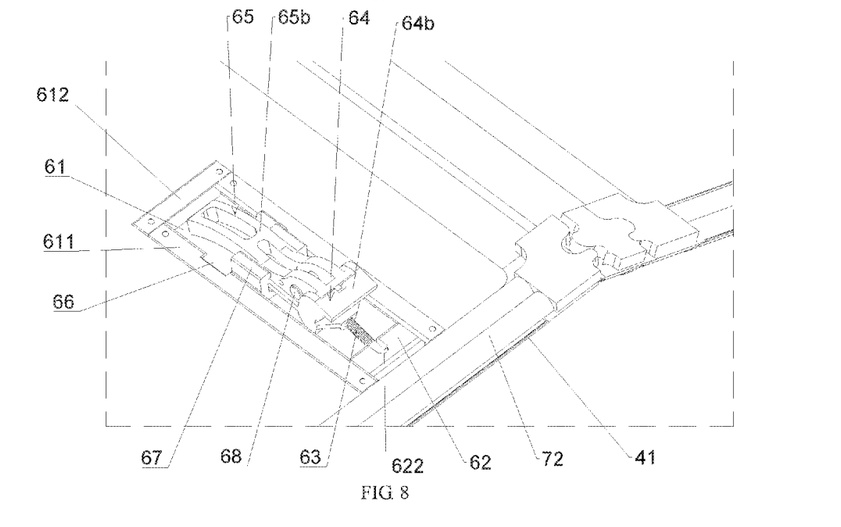
FIG. 8 and FIG. 9 are structural views of the fixing mechanism of the box cover of the pickup truck of the present invention.
Figure 9:
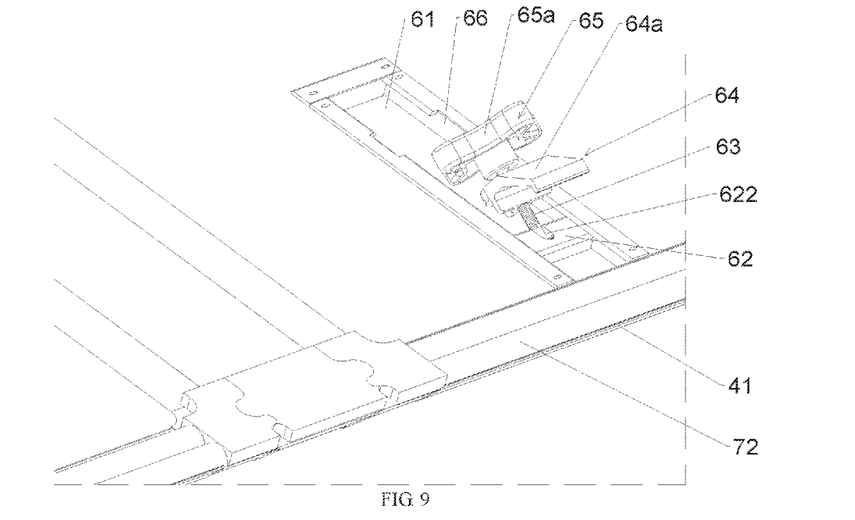

Referring to FIG. 7 to FIG. 11, the box cover of the pickup truck further includes at least one fixing mechanism 6 for installing the box cover of the pickup truck at the pickup truck box. The fixing mechanism 6 is disposed on at least one of backs of the panels 1. The "backs" refer to the sides facing the pickup truck box, which is used for better explaining instead of limiting the present invention. The at least one fixing mechanism 6 includes a fixing groove 61, a sliding block 62, a sliding bar 63, a buckle 64 and a fastener 65. The fixing groove 61 fixedly disposed in one of the panels 1, and a notch of the fixing groove 61 faces the back of the panel 1. The sliding block 62 slidably disposed in the fixing groove 61. A surface of the sliding bar 63 is provided with screw threads. One end of the sliding bar 63 is rotationally clamped in the sliding block 62. The buckle 64 movably sleeve on the sliding bar 63. The fastener 65 is movably disposed on one side of the buckle 64 to lock or unlock the buckle 64. Locking the buckle 64 refers to that the fastener 65 fixes the buckle 64 at any position of the sliding bar 63, and unlocking the buckle 64 refers to that the fastener 65 releases the locking of the buckle 64 and that the buckle 64 can slide along the sliding bar 63. When installing the box cover at the pickup truck, the sliding block 62 drives the buckle 64 to close to the inner edge of the pickup truck box, and then the buckle 64 is moved such that the buckle 64 clamps the inner edge of the pickup truck box, and then the buckle 64 is locked by the fastener 65, and then the box cover is installed at the pickup truck box. To open the box cover, the buckle 64 is unlocked by the fastener 65, and then the buckle 64 is moved out, and then the box cover can be opened. The fixing mechanisms 6 are simply structured and conveniently and firmly installed. When the box cover of the pickup truck is not needed to be used, rotating the sliding bar 63 can accommodate the fastener 65 and the buckle 64 in the fixing groove 61, reducing occupation space. According to different use conditions, the buckle 64 can be designed into different shapes. FIG. 8 and FIG. 9 show two kinds of buckles 64a and 64b in different shapes.

Figure 10:
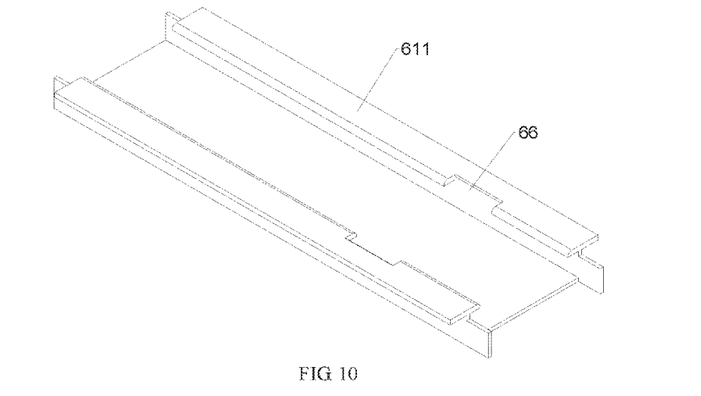
FIG. 10 is a structural view of the groove of the fixing mechanism of the box cover of the pickup truck of the present invention.

The fixing groove 61 includes at least two first openings 66. The first openings 66 are disposed on two sides of the fixing groove 61. When the sliding block 62 is moved to the first openings 66, the sliding block 62 can be taken out from the fixing groove 61, and thus installation and replacement of the sliding block 62 are both very convenient.

The fixing groove 61 includes a groove body portion 611 and a baffle 612, and the first openings 66 are disposed at the groove body portion 611. During installation, the two ends of the groove body portion 611 are respectively inserted into one of the panels 1 and one of the side fences 41. The baffle 612 is inserted into one side of the groove body portion 611 away from the side fences 41.

Figure 11:
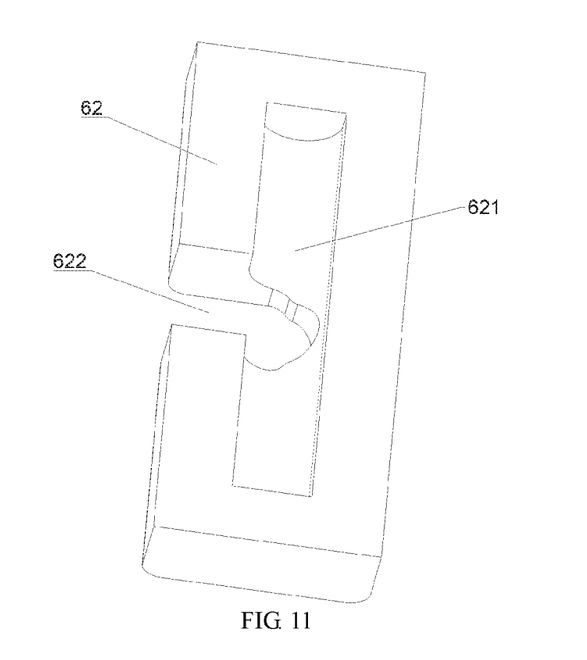
FIG. 11 is a structural view of the sliding block of the fixing mechanism of the box cover of the pickup truck of the present invention.

The sliding block 62 includes a clamping groove 621 and a through groove 622 communicating with the clamping groove 621. The clamping groove 621 is approximately vertical to the through groove 622. One end of the sliding bar 63 clamped at the sliding block 62 is T-shaped, and the T-shaped end of the sliding bar 63 is rotationally disposed in the clamping groove 621 and the through groove 622. The clamping groove 621 is a groove with a notch facing the bottom of the fixing groove 61, and the through groove 622 is a groove penetrating the upper and lower surfaces of the sliding block 62. When installing the box cover of the pickup truck at the pickup truck, the sliding bar 63 is abutting the inner wall of the through groove 622, ensuring that the sliding bar 63 keeps the vertical direction without inclination. When the box cover of the pickup box is in collision, the fixing mechanisms 6 firmly clamp the inner edge of the box cover of the pickup truck, and thus the box cover of the pickup truck is not easy to open.

Figure 1:
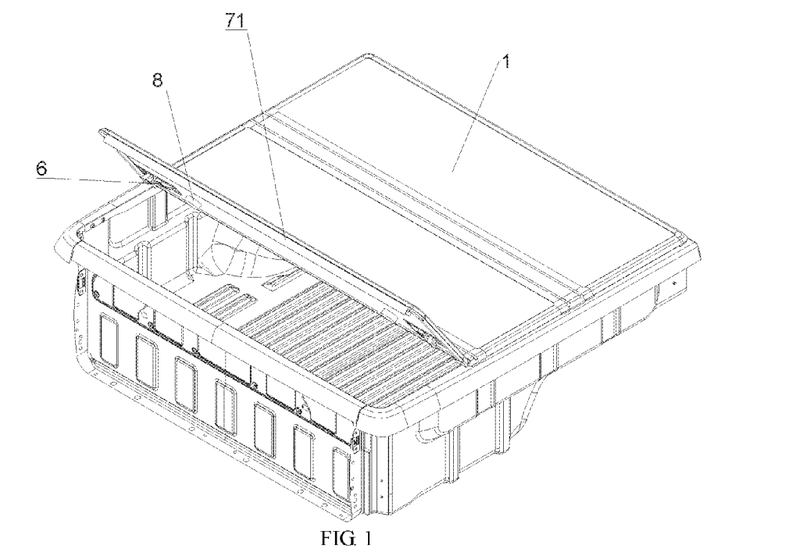
FIG. 1 is a structural view of the present invention, wherein the box cover of the pickup truck is installed on the pickup truck box.
Figure 2:
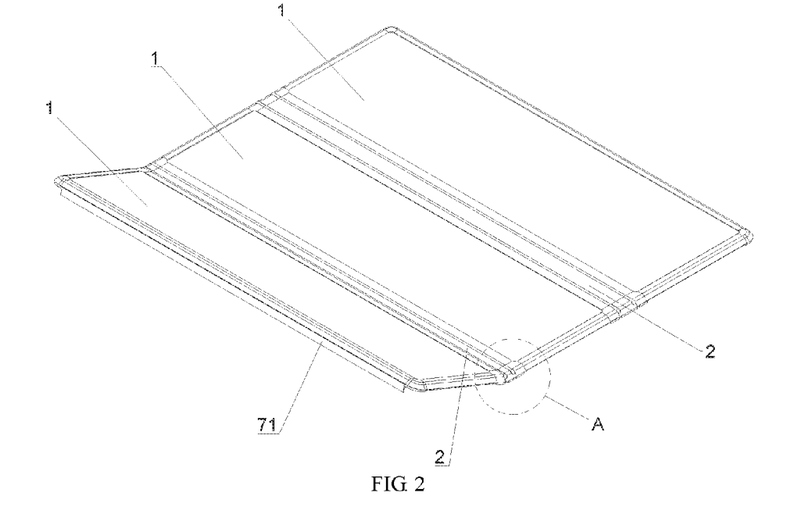
FIG. 2 is a front view of the box cover of the pickup truck of the present invention.

Referring to FIG. 1, FIG. 7, and FIG. 9, one of the panels 1 close to the front of the pickup truck is not required to be opened frequently, and thus the fastener of the fixing mechanism 6 close to the front of the pickup truck is a nut 65a, and the nut 65a is in threaded fit with the sliding bar 63. After the nut 65a locks the buckle 64a, the nut 65a does not slide relative to the sliding bar 63 when the box cover of the pickup truck is in collision, and thus preventing the buckle 64a from being unlocked and ensuring that the one of the panels 1 close to the front of the pickup truck is firmly installed.

Referring to FIG. 1, FIG. 7, and FIG. 8, the fastener of the fixing mechanism 6 close to the rear of the pickup truck is a spanner 65b, and the spanner 65b is rotationally installed at one end of the sliding bar 63. The spanner 65b is installed at one end of the sliding bar 63 through the rotating shaft 68. Rotating the spanner 65b can lock or unlock the buckle 64b, and thus the box cover of the pickup truck is conveniently installed and opened, and it is very convenient to use.

The fixing mechanism 6 further includes a spanner fixing block 67. The spanner fixing block 67 is disposed in the fixing groove 61. When the spanner 65b is not used, the spanner 65b is fixed in the spanner fixing block 67, avoiding occupying space. When the spanner 65b is used, the spanner is pulled out from the spanner fixing block 67, and it is very convenient to use. The spanner fixing block 67 is made of flexible plastics, and thus it is convenient to be fixed in the spanner fixing block 67 or pull out from the spanner fixing block 67.

Figure 12:
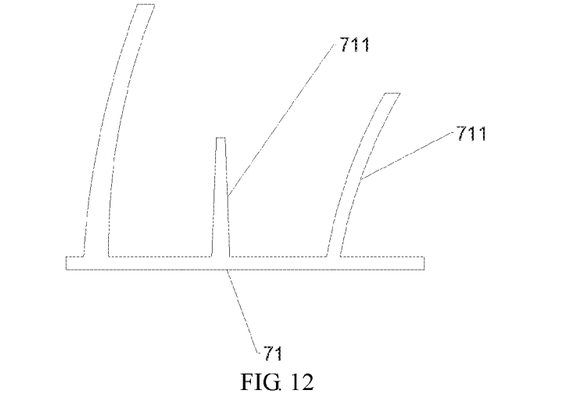
FIG. 12 is a schematic diagram of the cross section of the first waterproof strip of the box cover of the pickup truck of the present invention.
Figure 13:
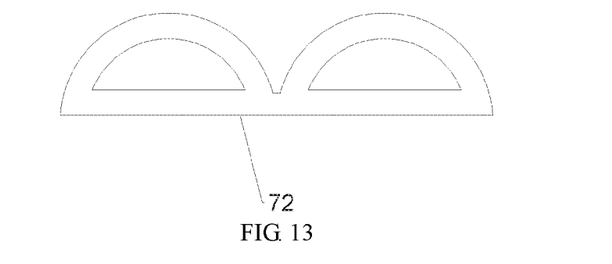
FIG. 13 is a schematic diagram of the cross section of the second waterproof strip of the box cover of the pickup truck of the present invention.

Referring to FIG. 1 and FIG. 7, the box cover of the pickup truck further includes a waterproof assembly. The waterproof assembly includes a first waterproof strip 71, a plurality of second waterproof strips 72, a third waterproof strip 73, a plurality of joint waterproof block units 74 and a plurality of corner waterproof blocks 75. The first waterproof strip 71 is disposed on one side of one of the panels 1, and the first waterproof strip 71 is approximately parallel to the rotating shaft mechanism 2. Referring to FIG. 12, the first waterproof strip 71 includes a plurality of sheets 711. The height of one of the sheets 711 disposed on the outer side is greater than the height of one of the sheets 711 disposed on the inner side. The structure of the first waterproof strip 71 is similar to a shark fin. The sheets 711 provide a multiple waterproof effect, and thus the first waterproof 71 has excellent waterproofness and high adaptability. The first waterproof strip 71 is disposed on the side of one of the panels 1 close to the rear of the pickup truck. The second waterproof strips 72 are disposed on the sides of all the panels 1, and the second waterproof strips 72 are approximately vertical to the rotating shaft mechanism 2. Referring to FIG. 13, the second waterproof strips 72 have double-D-shaped cross sections respectively to achieve excellent waterproofness. The third waterproof strip 73 is disposed on a side of one of the panels 1 close to the front of the pickup truck. The joint waterproof block units 74 are disposed on the backs of the rotating shaft joints 40 and the first angle joints 42. The corner waterproof blocks 75 are disposed on the backs of the second angle joints 43. The waterproof assembly completely encloses the sides of the back of the box cover of the pickup truck, achieving a very good waterproof effect.

Referring to FIG. 1 and FIG. 7, the box cover of the pickup truck further includes a plurality of anticollision pads 8. The anticollision pads 8 are disposed on the back of at least one of the panels 1, and thus the anticollision pads 8 are capable of avoiding collision between panels 1 when the box cover of the pickup truck is folded, and making storage convenient. The anticollision pads 8 are cylindrical, good-looking and pressure resistant.

The above embodiments are preferable embodiments of the present invention, but do not limit the present invention. Those skilled in this field can make various modifications and changes to the technical solution of the present invention according to the above methods and technical contents based on the essence and range of the present invention. Therefore, any simple amendments, equivalent changes and modifications made on the above embodiments according to the technical solution of the present invention shall fall within the protective scope of the present invention.

What is claimed is:

1. A box cover of a pickup truck comprising:
   at least two panels; and
   at least one rotating shaft mechanism connecting with the at least two panels, the at least one rotating shaft mechanism comprising:
   a base comprising a base portion and two rotating shaft portions, wherein the base portion has a hollow structure inside, the rotating shaft portions are disposed on two sides of the base portion, respectively, the base portion and one of the rotating shaft portions form a rotating space, and the rotating space is isolated from an interior of the base portion; and
   two connecting units, each of the connecting units comprising a fixing portion and a rotary portion, wherein the fixing portion is fixedly connected with one of the panels, and the rotary portion taking one of the rotating shaft portions as a rotating center is rotatably inserted into the rotating space; and
   a side assembly, wherein the side assembly comprises at least two rotating shaft joints, at least two side fences and at least two first angle joints, the side fences enclose sides of the panels, each of the first angle joints is connected with the fixing portion and one of the side fences, and the rotating shaft joints are connected with the base portion.

2. The box cover of the pickup truck according to claim 1, wherein each of the first angle joints comprises a convex portion, each of the rotating shaft joints comprises two concave portions, the convex portion is disposed opposite to one of the concave portions, a groove is formed between the convex portion and one of the concave portions, and the rotating space is communicated with the groove.

3. The box cover of the pickup truck according to claim 1, wherein each of the first angle joints comprises a first clamping portion and a second clamping portion, the first clamping portion is inserted into the fixing portion, and the second clamping portion is inserted into one of the side fences.

4. The box cover of the pickup truck according to claim 1, wherein each of the rotating shaft joints comprises a third clamping portion, and the third clamping portion is inserted into the base portion.

5. The box cover of the pickup truck according to claim 1, further comprising at least one fixing mechanism disposed on at least one of backs of the panels,
   the at least one fixing mechanism comprising:
   a fixing groove fixedly disposed in one of the panels, a notch of the fixing groove facing the backs of the panels;
   a sliding block slidably disposed in the fixing groove;
   a sliding bar, a surface of the sliding bar being provided with screw threads, one end of the sliding bar being rotationally clamped in the sliding block;
   a buckle movably sleeved on the sliding bar; and
   a fastener movably disposed on one side of the buckle to lock or unlock the buckle.

6. The box cover of the pickup truck according to claim 5, wherein the fixing groove comprises at least two first openings, and the first openings are disposed on two sides of the fixing groove.

7. The box cover of the pickup truck according to claim 5, wherein the sliding block comprises a clamping groove and a through groove communicated with the clamping groove, the clamping groove is approximately vertical to the through groove, one end of the sliding bar clamped at the sliding block is T-shaped, and the T-shaped end of the sliding bar is rotationally disposed in the clamping groove and the through groove.

8. The box cover of the pickup truck according to claim 5, wherein the fastener is a nut, and the nut is in threaded fit with the sliding bar.

9. The box cover of the pickup truck according to claim 5, wherein the fastener is a spanner, and the spanner is rotationally installed at one end of the sliding bar.

10. The box cover of the pickup truck according to claim 9, wherein the fixing mechanism further comprises a spanner fixing block, the spanner fixing block is disposed in the fixing groove; when the spanner is not used, the spanner is fixed in the spanner fixing block, and when the spanner is used, the spanner is pulled out from the spanner fixing block.

11. The box cover of the pickup truck according to claim 1, further comprising a waterproof assembly, wherein the waterproof assembly comprises a first waterproof strip, the first waterproof strip is disposed on one side of one of the panels, the first waterproof strip is approximately parallel to the rotating shaft mechanism, the first waterproof strip comprises a plurality of sheets, and the height of one of the sheets disposed on the outer side is greater than the height of one of the sheets disposed on the inner side.

12. The box cover of a pickup truck according to claim 11, wherein the waterproof assembly further comprises a plurality of second waterproof strips, the second waterproof strips are disposed on sides of all the panels, the second waterproof strips are approximately vertical to the rotating shaft mechanism, and the second waterproof strips have double-D-shaped cross sections respectively.

* * * * *